(12) United States Patent
Li

(10) Patent No.: US 12,413,655 B1
(45) Date of Patent: Sep. 9, 2025

(54) DETERMINING A TRANSPORT LAYER PROTOCOL FOR COMMUNICATION

(71) Applicant: TP-Link Systems Inc., Irvine, CA (US)

(72) Inventor: Kai Li, Chengdu (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 18/954,434

(22) Filed: Nov. 20, 2024

(51) Int. Cl.
  *H04L 69/18* (2022.01)
  *H04L 69/00* (2022.01)
  *H04L 69/326* (2022.01)

(52) U.S. Cl.
  CPC ............. *H04L 69/18* (2013.01); *H04L 69/02* (2013.01); *H04L 69/326* (2013.01)

(58) Field of Classification Search
  CPC ........ H04L 69/18; H04L 69/02; H04L 69/326
  See application file for complete search history.

(56) References Cited

U.S. PATENT DOCUMENTS

| | | | |
|---|---|---|---|
| 8,745,214 B2 * | 6/2014 | Inamdar | H04L 43/04 709/224 |
| 11,509,575 B2 | 11/2022 | Dutta | |
| 11,748,278 B2 * | 9/2023 | Yang | H04L 49/35 710/5 |
| 2018/0115438 A1 * | 4/2018 | Park | H04W 84/12 |
| 2024/0039829 A1 * | 2/2024 | Chen | H04L 45/02 |
| 2024/0356849 A1 * | 10/2024 | Inbal | H04L 45/566 |
| 2024/0429939 A1 * | 12/2024 | Cooper | H03M 7/3059 |

FOREIGN PATENT DOCUMENTS

| | | |
|---|---|---|
| CN | 112039775 B | 9/2022 |
| CN | 115277806 A | 11/2022 |
| CN | 115776527 A | 3/2023 |

* cited by examiner

*Primary Examiner* — Mohamed A. Wasel
(74) *Attorney, Agent, or Firm* — Loeb & Loeb LLP

(57) ABSTRACT

A method for determining a transport layer protocol for communication includes: receiving, from a client, a plurality of service requests based on a plurality of transport layer protocols; determining a plurality of sets of metric values of application layer metrics by determining a set of metric values of the application layer metrics based on receiving each of the plurality of the service requests, wherein the application layer metrics are associated with at least one of efficiency or quality of receiving the service request; and determining the transport layer protocol for communication from the plurality of transport layer protocols based on the determined plurality of sets of metric values.

19 Claims, 3 Drawing Sheets

DETERMINING A TRANSPORT LAYER PROTOCOL FOR COMMUNICATION

TECHNICAL FIELD

The present disclosure relates to the field of network communication, particularly to a method, an electronic device, and a non-transitory computer readable storage medium for determining a transport layer protocol for communication.

BACKGROUND

The quick user datagram protocol (UDP) internet connection (QUIC) protocol, as a new transport layer protocol, effectively solves the problems of queue head blocking and handshake delay in the transmission control protocol (TCP), and has better transmission performance. However, due to the fact that the QUIC protocol is based on UDP, some regions or internal networks will intercept UDP packets. Thus, if the transport layer protocols for applications are all switched to the QUIC protocol, there may be a high risk of losing packets in the network communication. Therefore, it is necessary to support a plurality of transport layer protocols simultaneously and dynamically choose the best transport layer protocol for communication according to the actual communication situation, which is also called transport layer protocol racing.

Currently, the widely used method for transport layer protocol racing is that the client uses different transport layer protocols to initiate requests at the same time, and the server only processes the requests that arrive first and rejects the requests that arrive later, thus realizing the transport layer protocol racing.

SUMMARY

Based on the above, the present disclosure provides a method, an electronic device, and a non-transitory computer readable storage medium for determining a transport layer protocol for communication.

In an aspect of the present disclosure, the present disclosure provides a method for determining a transport layer protocol for communication, comprising: receiving, from a client, a plurality of service requests based on a plurality of transport layer protocols; determining a plurality of sets of metric values of application layer metrics by determining a set of metric values of the application layer metrics based on receiving each of the plurality of the service requests, wherein the application layer metrics are associated with at least one of efficiency or quality of receiving the service request; and determining the transport layer protocol for communication from the plurality of transport layer protocols based on the determined plurality of sets of metric values.

In another aspect of the present disclosure, the present disclosure provides an electronic device for determining a transport layer protocol for communication, comprising: one or more processors; a memory coupled to at least one of the processors; and a set of computer program instructions stored in the memory, which, when executed by at least one of the processors to cause the electronic apparatus to: receive, from a client, a plurality of service requests based on a plurality of transport layer protocols; determine a plurality of sets of metric values of application layer metrics by determining a set of metric values of the application layer metrics based on receiving each of the plurality of the service requests, wherein the application layer metrics are associated with at least one of efficiency or quality of receiving the service request; and determine the transport layer protocol for communication from the plurality of transport layer protocols based on the determined plurality of sets of metric values.

In another aspect of the present disclosure, the present disclosure provides a non-transitory computer readable storage medium having instructions stored thereon, when executed by a processor, causing the processor to: receive, from a client, a plurality of service requests based on a plurality of transport layer protocols; determine a plurality of sets of metric values of application layer metrics by determining a set of metric values of the application layer metrics based on receiving each of the plurality of the service requests, wherein the application layer metrics are associated with at least one of efficiency or quality of receiving the service request; and determine the transport layer protocol for communication from the plurality of transport layer protocols based on the determined plurality of sets of metric values.

The present disclosure also provides an electronic apparatus comprising means for performing the method according to embodiments of the present disclosure.

The present disclosure also provides a computer program product comprising instructions, when executed by a processor, causing the processor to perform the method according to embodiments of the present disclosure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The above as well as other objects, features and advantages of the present disclosure will become more apparent from the following more detailed description of embodiments thereof taken in conjunction with the accompanying drawings. The accompanying drawings are used to provide a further understanding of embodiments of the present disclosure, and constitute a part of the specification. The drawings together with the embodiments of the present disclosure are used to explain the present disclosure, but do not constitute a limitation of the present disclosure. In the drawings, like reference numerals refer to like means, steps or elements, unless expressly indicated otherwise. In the drawings.

DETAILED DESCRIPTION

Figure 1:
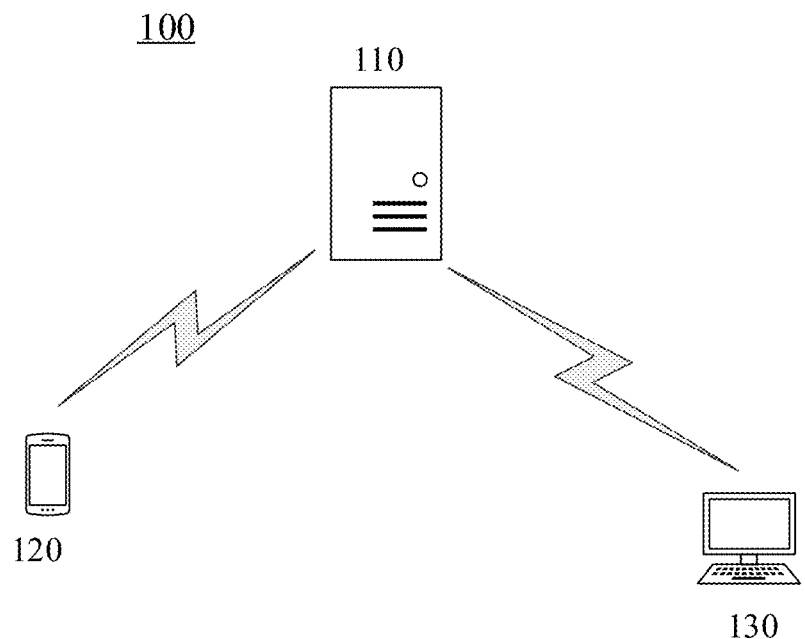
FIG. 1 illustrates an example network system according to an embodiment of the present disclosure.

A clear and complete description will be made below on the technical solutions of the present disclosure in conjunction with the accompanying drawings. Apparently, the described embodiments are part of the embodiments of the present disclosure, rather than all of the embodiments. Based on the embodiments in the present disclosure, all other embodiments obtained by those of ordinary skill in the art without making creative labor, belong to the protection scope of the present disclosure.

In the description of the present disclosure, it is to be noted that an orientation or positional relationship indicated by terms "center," "upper," "lower," "left," "right," "vertical," "horizontal," "inner," "outer," and the like are an orientation or positional relationship shown based on the drawings, which is only for convenience of describing the present disclosure and simplifying the description, and do not indicate or imply that the referred apparatus or element must have a particular orientation, be constructed and operate in a particular orientation, and thus are not to be construed as limiting the present disclosure. Moreover, terms "first," "second," and "third" are used for descriptive purposes only and are not to be understood as indicating or implying relative importance. Likewise, terms such as "a," "an," "the," and the like do not denote a limitation of quantity, but rather denote the presence of at least one. Terms such as "comprising" or "including" and the like means that the elements or items preceding the terms encompass the elements or items and equivalents thereof listed after the terms, but does not exclude other elements or items. Terms such as "connect," "connected," or "coupled" and the like are not restricted to physical or mechanical connections, but can include electrical connections, whether direct or indirect.

In the description of the present disclosure, it should be noted that terms "mounted", "connect", "connected" or "coupled" are to be understood broadly unless expressly specified and limited otherwise. For example, it may be fixedly connected, removably connected, or integrally connected; be mechanical or electrical connections; be direct or indirect through an intermediate medium, or be internal connectivity in the two elements. The specific meanings of the above terms in the present disclosure can be understood in specific cases to those of ordinary skill in the art.

Further, technical features involved in different implementations of the present disclosure described below may be combined with each other as long as they do not conflict with each other.

As described above, currently, the widely used method for transport layer protocol racing is that the client uses different protocols to initiate requests at the same time, and the server only processes the requests that arrive first, and rejects the requests that arrive later, thus realizing the transport layer protocol racing. This method will trigger the same request of multiple different transport layer protocols, which will cause additional resource consumption for the client and the server. Moreover, the sequence of requests arriving at the server is only related to the first few handshake packets and request headers in the requests, which cannot represent the actual transmission quality of the complete request. If the time when the request is completely received is used as the basis for transport layer protocol racing, the resource occupation of the server and the client will be greater, and the processing capacity of the server will be seriously reduced.

In addition, there is another method for transport layer protocol racing to determine the best transport layer protocol by collecting the actual transport layer metrics of different transport layer protocols. For example, the transport layer protocol for communication is dynamically adjusted by collecting the network delay and packet loss rate of the transport layer protocols (such as TCP and QUIC protocols) as the metrics for transport layer protocol racing. This method collects the communication metrics of the transport layer for transport layer protocol racing, which requires professional network monitoring tools or underlying logic for going deep into the transport layer protocol, which is extremely expensive for application developers and has strong limitations.

Another method for realizing dynamic selection of transport layer protocols for file transmission based on a cloud storage system selects the transport layer protocol for file transmission, by collecting transport layer metrics of different transport layer protocols in historical file transmission (e.g., a file size, network round trip time (RTT), a network bandwidth, a network packet loss rate, a network jitter and file transmission time), establishing a multiple linear regression model by using the collected data in advance, and collecting the transport layer metrics again before each request is sent, and substituting the collected metrics into the pre-established prediction model, and selecting the transport layer protocol with the shortest prediction time. It can be seen that this method needs to collect a large number of historical data in advance to establish the prediction model, which involves pre-data collection and model calculation and has high complexity. Moreover, the accuracy of the prediction model is strongly related to the quantity and correctness of historical data, and thus the uncertainty is strong. At the same time, the collected data involves the network RTT, the network bandwidth, the network packet loss rate, the network jitter, and other network transport layer metrics, which requires professional network monitoring tools or underlying logic for going deep into the transport layer protocol, which is extremely expensive for application developers and has strong limitations.

Based on the above, this disclosure proposes a method, an electronic device, and a non-transitory computer readable storage medium for determining a transport layer protocol for communication (i.e., the transport layer protocol racing). This method according to embodiments of this disclosure can determine the best transport layer protocol for communication between a client and a server based on the communication metrics (i.e., application layer metrics) that can be perceived and easily collected by the application layer, which can be directly realized in application program codes without the help of the professional network detection tools or the underlying logic for going deep into the transport layer protocol, so that the method has a wide application range and is convenient to realize. The method according to embodiments of this disclosure can be used at any time when it is necessary, for example, when the client connects to the network, when the network of the client changes (e.g., the client reconnects to the network after disconnecting or the client switches to another network), and/or when the validity period set for the determined transport layer protocol expires, and the like.

FIG. 1 illustrates an example network system 100 according to an embodiment of the present disclosure. As shown in FIG. 1, the network system 100 may comprise a server 110 and two clients 120 and 130. The clients 120 and 130 can connect to the server 110 via a wired connection or a wireless connection. In this disclosure, the server 110 may be a computer hardware device or software program which is installed on a physical server or virtual machine. The server 110 can be any kind of server, for example but not limited to, a web server, a database server, a financial server, a mail server, a print server, a cluster server, and the like. The client can be the program corresponding to the server and providing local services for customers. The client generally installed in a client device. The client can be any kind of client, for example but not limited to, a DNS client, a wed client, a gaming client, a mobile client and the like. The device installing the client (i.e., client device) can be any kind of electronic device, for example but not limited to, a mobile phone, a desktop computer, a notebook computer, a tablet computer, a TV, a camera, a music player, a gaming player and the like.

Notably, although one server and two clients are shown in FIG. 1, this is an example but not a limitation. The network system according to the embodiment of this disclosure can comprise more or fewer servers and clients, and the servers and the clients can be interconnected. Moreover, one client can be a server for another client. For example, in certain situations, the client 120 can be a server for the client 130, vice versa.

Figure 2:
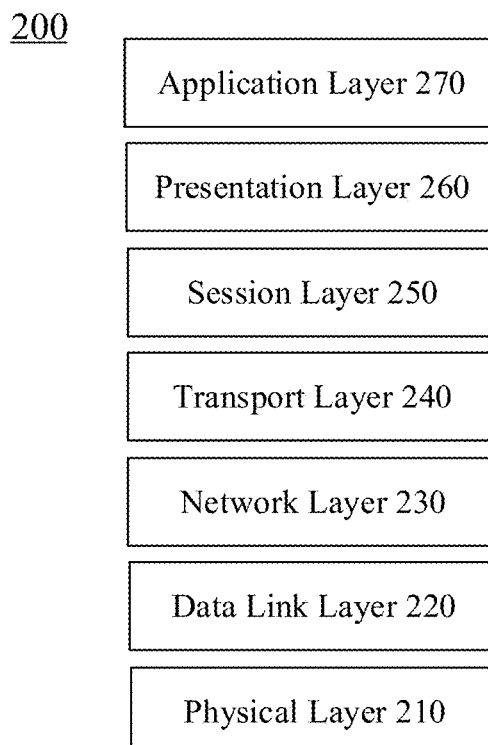
FIG. 2 illustrates an example network model according to an embodiment of the present disclosure.

FIG. 2 illustrates an example network model 200 according to an embodiment of the present disclosure. The network model 200 shown in FIG. 2 is a 7-layer open system interconnect (OSI) model. The network model 200 comprises a physical layer 210, a data link layer 220, a network layer 230, a transport layer 240, a session layer 250, a presentation layer 260, and an application layer 270. The physical layer 210 is responsible for processing an original bit stream on the physical transmission medium to ensure that data can be transmitted in an appropriate way on the transmission medium, and its example tasks comprise a bit coding, a voltage specification, and a physical topology, etc. The data link layer 220 is responsible for dividing the original bit stream into frames and adding address information to transmit data between connected devices, and its example tasks comprise frame encapsulation, the MAC address management, the error detection and correction. The network layer 230 is responsible for transmitting data between different networks, routing data packets and ensuring that the data can reach the target devices, and its example tasks comprise the IP address assignment, routing, packet forwarding, etc. The transport layer 240 is responsible for providing end-to-end data transmission service to ensure data reliability, flow control and error detection, and its example tasks comprises the port management, flow control, data segmentation and reorganization, etc. The session layer 250 is responsible for managing the establishment, maintenance and end of the session, and handling the errors and synchronization problems at the session level; and its example tasks comprise session control, session recovery, etc. The presentation layer 260 is responsible for format conversion, encryption and decryption of the data to ensure that the application can correctly interpret the data, and its example tasks comprise compression, encryption and decryption, data format conversion of the data, etc. The application layer 270 is responsible for providing users with network application services, including file transfer, e-mail, web browsing, etc., and its example tasks comprise application program interface, user authentication, data transmission, etc. As described above, a plurality of transport layer protocols can be used for the communication of the transport layer, for example, UDP, TCP, and QUCI, and the like.

Notably, the 7-layer OSI model shown in FIG. 2 is just an example but not a limitation, the OSI model involved in the disclosure can also be a 5-layer OSI model comprising a physical layer, a data link layer, a network layer, a transport layer and an application layer, or other OSI model for network communication.

Figure 3:
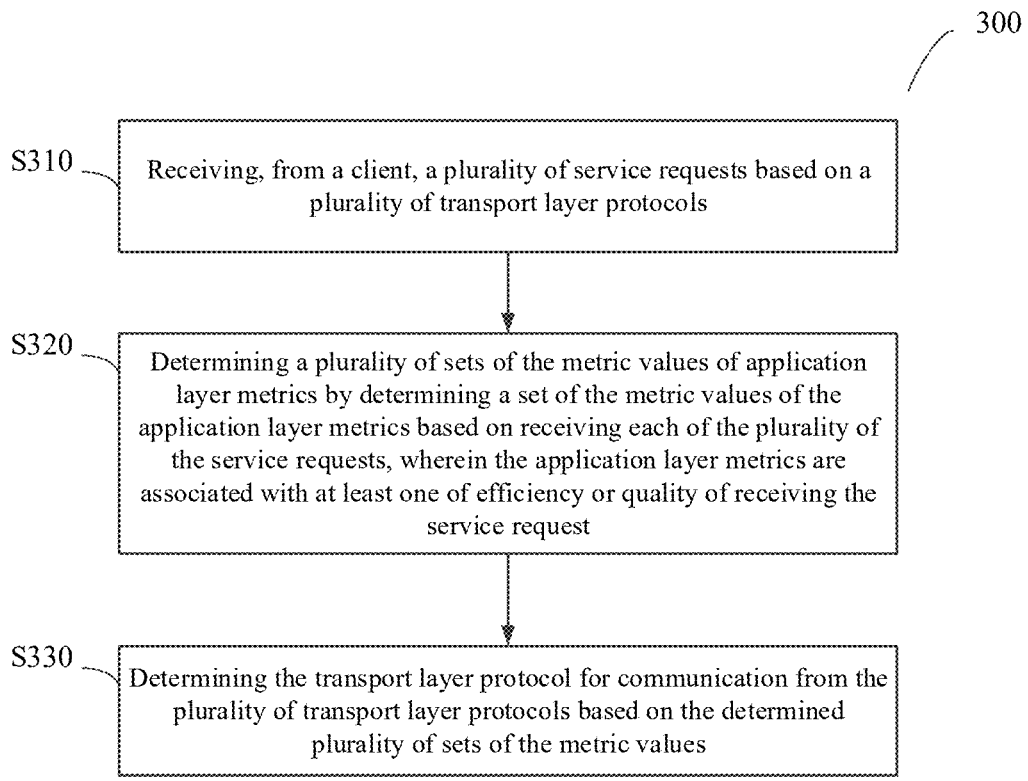
FIG. 3 illustrates an example method for determining a transport layer protocol for communication, according to an embodiment of the present disclosure.

FIG. 3 illustrates an example method 300 for determining a transport layer protocol for communication, according to an embodiment of the present disclosure. The method 300 may be performed by a server. As shown in FIG. 3, the method 300 starts from step S310.

At step S310, a plurality of service requests based on a plurality of transport layer protocols are received from a client (e.g., client 120 or 130 shown in FIG. 1). The plurality of transport layer protocols can comprise any current transport layer protocols (such as UDP, TCP, and QUCI protocol) or any transport layer protocols developed in future. Exemplarily, the service request can be a real traffic request, which can carry the request header "Compete=true" additionally, to indicate that this service request is used for the transport layer protocol racing. Of course, the service request can be another service request, such as a service request dedicated to the transport layer protocol racing, which is not limited in this disclosure. In one embodiment, Step 310 can be performed right after the client connects to the network. In another embodiment, Step 310 can be performed after the connectivity test between the client and the server is completed. In this case, the server can provide a simple connectivity hypertext transfer protocol (HTTP) test interface and directly responds to a specified status code (e.g., 200) after receiving a request from the client. Specifically, after the client connects to the network, the client immediately uses the plurality of transport layer protocols to test the connectivity. After receiving a response with the specified status code transmitted from the server, the client marks the protocol connectivity and records it locally. Then the client transmits the plurality of service requests based on the plurality of transport layer protocols, and the server receives the plurality of service requests based on the plurality of transport layer protocols (i.e., S310).

At step S320, a plurality of sets of metric values of application layer metrics are determined by determining a set of metric values of the application layer metrics based on receiving each of the plurality of the service requests. The application layer metrics can be associated with at least one of efficiency or quality of receiving the service request. That's, the application layer metrics can indicate at least one of efficiency or quality of receiving the service request. Exemplarily, the application layer metrics can comprise at least one of time consumption for receiving the service request, a transmission rate of the service request, or transmission integrity of the service request. The time consumption can indicate a time interval between a time at which the receiving of the service request is started and a time at which the receiving of the service request is completed. The transmission rate can indicate a result of dividing an actual size of the received service request by the time consumption. The transmission integrity can indicate a result of dividing a reported size of the service request by the actual size of the received service request. The time consumption for receiving the service request, and the transmission rate of the service request can be associated with the efficiency of receiving the service request, and the transmission integrity of the service request can be associated with the quality of receiving the service request. Notably, the time consumption for receiving the service request, the transmission rate of the service request, and the transmission integrity of the service request are merely examples of the application layer metrics, but not a limitation. In this disclosure, the application layer metrics can be any application layer metrics associated with the efficiency or the quality of receiving the service request.

At step S330, the transport layer protocol for communication is determined (e.g., selected) from the plurality of transport layer protocols based on the determined plurality of sets of metric values. In an embodiment, the transport layer protocol for communication can be determined based on the comparison of a weighted sum of the determined plurality of sets of metric values. Exemplarily. The transport layer protocol for communication can be determined by determining the weighted sum of the determined plurality of sets of metric values, and determining the transport layer protocol corresponding the largest weighted sum as the transport layer protocol for the communication. For example, it is assumed that the plurality of transport layer protocols are the TCP, UDP and QUCI protocols, and the application metrics are the transmission rate of the service request, and the transmission integrity of the service request. For the TCP protocol, the determined set of metric values of application layer metrics are $\{TR_{TCP}, TI_{TCP}\}$, where $TR_{TCP}$ indicates the transmission rate of the service request when receiving the service request based on the TCP protocol, and $TI_{TCP}$ indicates the transmission integrity of the service request when receiving the service request based on the TCP protocol. For the UDP protocol, the determined set of metric values of application layer metrics are $\{TR_{UDP}, TI_{UDP}\}$, where $TR_{UDP}$ indicates the transmission rate of the service request when receiving the service request based on the UDP protocol, and $TI_{UPD}$ indicates the transmission integrity of the service request when receiving the service request based on the UDP protocol. For the QUCI protocol, the determined set of metric values of application layer metrics are $\{TR_{QUCI}, TI_{QUCI}\}$, where $TR_{QUCI}$ indicates the transmission rate of the service request when receiving the service request based on the QUCI protocol, and $TI_{QUCI}$ indicates the transmission integrity of the service request when receiving the service request based on the QUCI protocol. The weighted sum of the determined sets of metric values for the TCP, UDP and QUCI protocols can be determined according to the following equations, $$WS_{TCP} = \alpha_1 TR_{TCP} + \alpha_2 TI_{TCP} \quad (1)$$

$$WS_{UDP} = \alpha_1 TR_{UPD} + \alpha_2 TI_{UPD} \quad (2)$$

$$WS_{QUCI} = \alpha_1 TR_{QUCI} + \alpha_2 TI_{QUCI} \quad (3)$$

Where, $WS_{TCP}$ indicates the weighted sum of the determined sets of metric values for the TCP, $WS_{UDP}$ indicates the weighted sum of the determined sets of metric values for the UDP, $WS_{QUCI}$ indicates the weighted sum of the determined sets of metric values for the QUCI, $\alpha_1$ and $\alpha_2$ are weights and the sum thereof can be 1.

After determining $WS_{TCP}$, $WS_{UDP}$ and $WS_{QUCI}$, the TCP protocol is determined as the transport layer protocol for communication between the client and the server if $WS_{TCP}$ is larger than $WS_{UDP}$ and $WS_{QUCI}$. The UDP protocol is determined as the transport layer protocol for communication between the client and the server if $WS_{UPD}$ is larger than $WS_{TCP}$ and $WS_{QUCI}$. The QUCI protocol is determined as the transport layer protocol for communication between the client and the server if $WS_{QUCI}$ is larger than $WS_{TCP}$ and $WS_{UDP}$.

The above method for determining the transport layer protocol for communication directly based on a weighted sum of the determined plurality of sets of metric values may have a big error. This is because there is a big difference between the value of the transmission rate (i.e., TR) and the value of the transmission integrity. Theoretically, the value of the transmission rate (i.e., TR) is infinity, and the value of the transmission integrity (i.e., TI) is 0 to 1. Therefore, there may be a big error in determining which protocol is better by directly weighting and summing the determined plurality of sets of metric values. For example, if the transmission rate and the transmission integrity of the TCP protocol is 0.9, and 500 respectively, the transmission rate and the transmission integrity of the QUCI protocol is 0.1, and 510 respectively, and $\alpha_1$ and $\alpha_2$ are 0.5 and 0.5, according to the above equations (1) and (3), the $WS_{TCP}$ is 250.45 and $WS_{QUCI}$ is 255.05, and thus the QUCI protocol will be determined as the protocol for the communication. It is obvious that this determination is incorrect, since the transmission integrity of the determined protocol QUCI for the communication is very poor, which is not acceptable generally.

Based on the above, the present disclosure proposes another method for determining the transport layer protocol for communication, which is based on a weighted sum of a set of change ratios (i.e., normalized metric value differences) of metric values within a set of metric values for one protocol relative to corresponding metric values within a set of metric values for another protocol. For example, a preferred transport layer protocol for the communication can be determined from any two of the plurality of the transport layer protocols according to the method shown in FIG. 4. Then a more preferred transport layer protocol can be determined from the determined preferred transport layer protocol and one of the remaining transport layer protocol of the plurality of transport layer protocols in the same way. This process can be repeated till the best preferred transport layer protocol is determined, which is the transport layer protocol for communication between the client and the server.

Figure 4:
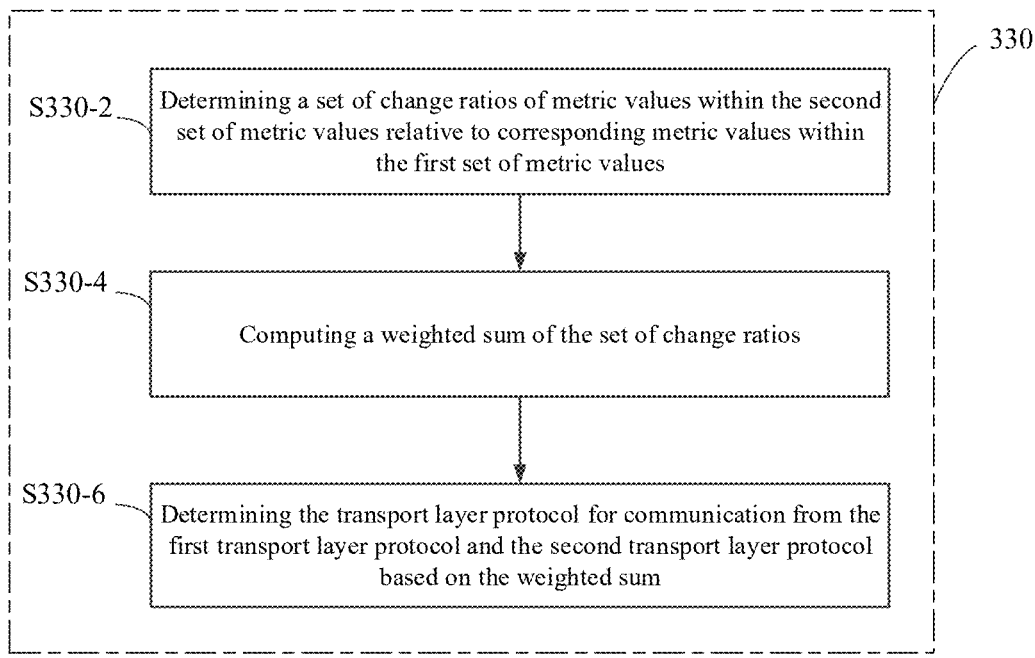
FIG. 4 is an example flow chart for further illustrating step S330 shown in FIG. 3 according to an embodiment of the present disclosure.

FIG. 4 is an example flow chart for further illustrating step S330 shown in FIG. 3 according to an embodiment of the present disclosure. In the example of FIG. 4, the plurality of transport layer protocols can comprise a first transport layer protocol and a second transport layer protocol, and the determined plurality of sets of metric values can comprise a first set of metric values corresponding to the first transport layer protocol and a second set of metric values corresponding to the second transport layer protocol.

At step S330-2, a set of change ratios of metric values within the second set of metric values relative to corresponding metric values within the first set of metric values is determined. Specifically, the set of change ratios can be determined by determining a set of metric value differences between the first set of metric values and the second set of metric values and then diving differences within the set of metric value differences by corresponding metric values of the first set of metric values.

At step S330-4, a weighted sum of the set of change ratios is computed. At step S330-6, the transport layer protocol for communication is determined from the first transport layer protocol and the second transport layer protocol based on the weighted sum. Exemplarily, the transport layer protocol for communication can be determined based on the weighted sum by comparing the weighted sum with a threshold; and determining the transport layer protocol for communication from the first transport layer protocol and the second transport layer protocol based on the comparison. In an embodiment, the threshold can be fixed to zero. In another embodiment, the threshold can be set based on the priority of the first and the second transport layer protocol. For example, if the priority of the first transport layer protocol is equal to the priority of the first transport layer protocol, the threshold can be set to zero. If the priority of the first transport layer protocol is larger than the priority of the first transport layer protocol, the threshold can be set to a non-zero. The threshold can be a positive number if the metric value difference used for determining the change ratio is determined by the metric values corresponding to the transport layer protocol with higher priority minus the metric values corresponding to the transport layer protocol with lower priority. Otherwise, the threshold can be a negative number. This manner can determine a more suitable transport layer protocol for the communication between the client and the server, compared with the threshold being fixed as zero.

For a better understanding of the method shown in FIG. 4, a specific example is given in the following. In this example, it is assumed that the plurality of transport layer protocols are the TCP, UDP and QUCI protocols, and the application layer metrics are the transmission rate of the service request and transmission integrity of the service request. For the TCP, UDP and QUCI protocols, the determined set of metric values of application layer metrics are $\{TR_{TCP}, TI_{TCP}\}$, $\{TR_{UDP}, TI_{UDP}\}$ and $\{TR_{QUCI}, TI_{QUCI}\}$ respectively. The threshold is zero. First, a preferred transport layer protocol is determined from the TCP and UDP protocols, and the final transport layer protocol is determined from the preferred transport layer protocol between the TCP and UDP protocols, and the QUCI protocol.

Specifically, the weighted sum of the set of change ratios of metric values within the determined set of metric values for the TCP protocol relative to corresponding metric values within the determined set of metric values for the UDP protocol can be determined according to the following equation, $$WS_{change\text{-}ratio} = \beta_1 * TR_{TCP} - TR_{UPD}/TR_{TCP} + \beta_2 * TI_{TCP} - TI_{UDP}/TI_{TCP} \quad (4)$$

Where, $WS_{change\text{-}ratio}$ indicates the weighted sum of the set of change ratios, $\beta_1$ and $\beta_2$ are weights and the sum thereof can be 1.

Then, if $WS_{change\text{-}ratio}$ of the above equation (4) is larger than 0, the TCP protocol is determined as the preferred transport layer protocol for the communication between the TCP and the UDP protocols. Otherwise, the UPD protocol is determined as the preferred transport layer protocol for the communication.

In this case, it is assumed that $WS_{change\text{-}ratio}$ is larger than 0, and then the TCP protocol is determined as the preferred transport layer protocol for the communication between the TCP and the UDP protocols. Then, the weighted sum of the set of change ratios of the determined set of metric values for the determined preferred transport layer protocol (i.e., the TCP protocol) relative to the determined set of metric values for the QUCI protocol can be determined according to the following equations, $$WS_{change\text{-}ratio} = \beta_1 * TR_{TCP} - TR_{QUCI}/TR_{TCP} + \beta_2 * TI_{TCP} - TI_{QUCI}/TI_{TCP} \quad (5)$$

Similarly, if $WS_{change\text{-}ratio}$ of the above equations (5) is larger than 0, the TCP protocol is determined as the preferred transport layer protocol for the communication between the TCP and the UDP protocols. Otherwise, the QUCI protocol is determined as the preferred transport layer protocol for the communication. In this case, it is assumed that the $WS_{change\text{-}ratio}$ is smaller than 0, and then the QUCI protocol is determined as the final transport layer protocol for the communication among the TCP, UDP and QUCI protocols.

With the method described above with reference FIG. 4, the above problem that there is a big error in determining the transport layer protocol for communication based on a direct weighted sum of the determined plurality of sets of metric values can be solved. For example, still assuming the transmission rate and the transmission integrity of the TCP protocol is 0.9, and 500 respectively, the transmission rate and the transmission integrity of the QUCI protocol is 0.1, and 510 respectively, $\beta_1$ and $\beta_2$ are 0.5 and 0.5, according to the above equation (5), the $WS_{change\text{-}ratio}$ is about 0.87 which is larger than 0, and thus the TCP protocol will be determined as the protocol for the communication. It is obvious that this determination is expected.

Notably, although in the above example, the application layer metrics for determining the transport layer protocol merely comprise the transmission rate of the service request, and the transmission integrity of the service request, the application metrics for determining the transport layer protocol for communication can comprise more or fewer application layer metrics. For example, in addition to the transmission rate of the service request, and the transmission integrity of the service request, the application metrics for determining the transport layer protocol for communication can comprise the time consumption for receiving the service request. In this case, the equations used above can be adaptively adjusted. For example, it is assumed, for the TCP protocol, the determined set of metric values of application layer metrics are $\{TR_{TCP}, TI_{TCP}, TC_{TCP}\}$, where $TR_{TCP}$ and $TI_{TCP}$ are the same as above, and $TC_{TCP}$ indicates the time consumption for receiving the service request when receiving the service request based on the TCP protocol. For the UDP protocol, the determined set of metric values of application layer metrics are $\{TR_{UDP}, TI_{UDP}, TC_{UPD}\}$, where $TR_{UDP}$ and $TI_{UDP}$ are the same as above, and $TC_{UDP}$ indicates the time consumption for receiving the service request when receiving the service request based on the UDP protocol. The above equation (4) can be adjusted as follows, for example.

$$WS_{change\text{-}ratio} = \beta_1 * \frac{TR_{TCP} - TR_{UPD}}{TR_{TCP}} + \beta_2 * \frac{TI_{TCP} - TI_{UDP}}{TI_{TCP}} + \beta_3 * \frac{TC_{UDP} - TC_{TCP}}{TC_{TCP}} \quad (6)$$

Where, $WS_{change\text{-}ratio}$ indicates the weighted sum of the set of change ratios, $\beta_1$, $\beta_2$ and $\beta_3$ are weights and the sum thereof can be 1.

Regarding the set of weights for computing the weighted sum (e.g., $\beta_1$, $\beta_2$ and $\beta_3$), in an embodiment, the set of weights can be fixed. In another embodiment, the set of weights for computing the weighted sum can be determined based on a communication scenario. Exemplarily, for a first communication scenario which gives priority to integrity of data transmission (e.g., the file and video uploading scenario), a sum of a first subset of the set of weights can be larger than a sum of a second subset of the set of weights. For example, each of the first subset of the set of weights can be larger than each of the second subset of the set of weights. Application layer metrics (e.g., the transmission integrity of the service request) corresponding to the first subset of the set of weights (e.g., $\beta_2$) are associated with the quality of receiving the service request, and application layer metrics (e.g., the time consumption for receiving the service request and/or the transmission rate of the service request) corresponding to the second subset of the set of weights (e.g., $\beta_1$ and $\beta_3$) are associated with the efficiency of receiving the service request. For a second communication scenario (e.g., a live broadcast and voice call scenario) which gives priority to real-time performance of data transmission, the sum of the first subset of the set of weights (e.g., $\beta_2$) is smaller than the sum of the second subset of the set of weights (e.g., $\beta_1$ and $\beta_3$). In this manner, the weights can be adjusted based on the communication scenario, and accordingly the transport layer protocol suitable for a specific scenario can be determined, thereby improving user experience of the client.

In addition, there may be a situation in which a part or all of the plurality of the service requests in Step 310 are lost. In this case, in a case where a part of the plurality of the service requests are not received successfully, one or more transport layer protocols corresponding to the one or more service requests not received successfully are excluded from the plurality of transport layer protocols when determining the transport layer protocol for communication. For example, assuming the plurality of transport layer protocols are TCP, UDP, and QUCI protocols and the service request of the UDP protocol is lost, when determining the transport layer protocol for communication, the UDP protocol is excluding from the TCP, UDP, and QUCI protocols. That is, the transport layer protocol for communication can be determined from only the TCP and QUCI protocols. Further, in a case where all of the plurality of the service requests are not received successfully, a transport layer protocol with a highest priority among the plurality of transport layer protocols can be determined as the transport layer protocol for communication.

Moreover, after determining the transport layer protocol for communication based on the above disclosure, a validity period for the determined transport layer protocol for communication can be set by the server. The set validity period can be indicated in the response which can indicates the determined transport layer protocol to the client to inform the client of the validity period. When the set validity period expires, the client can re-perform the Step 310 to initiate the procedure for determining the transport layer protocol for communication between the client and the service. In an embodiment, respective validity periods of respective transport layer protocols can be fixed. In another embodiment, respective validity periods of respective transport layer protocols can be dynamically adjusted based on the result of determining the transport layer protocol. In this manner, a more suitable validity period can be set for the determined the transport layer protocol, thereby facilitating the communication between the client and the server.

For example, for each of the plurality of transport layer protocols, its next corresponding validity period can be determined by multiplying its current corresponding validity period and a current validity factor. Respective initial validity periods corresponding to respective transport layer protocols can be the same in an embodiment. In another embodiment, the respective initial validity periods corresponding to the respective transport layer protocols can be different from each other. Exemplarily, the respective initial validity periods corresponding to the respective transport layer protocols can be based on the respective priorities of the respective transport layer protocols. Specifically, the respective initial validity periods corresponding to the respective transport layer protocols can be proportional to the respective priorities of the respective transport layer protocols. The current validity factor can be based on the result of determining the transport layer protocol. Exemplarily, for each of the plurality of transport layer protocols, its current validity factor is a validity factor larger than 1 when the transport layer protocol is determined as the transport layer protocol for communication, and its current validity factor is a validity factor smaller than 1 when the transport layer protocol is not determined as the transport layer protocol for communication. Since the validity factor of the transport layer protocol can be smaller than 1, there may be a case where the determined validity period is smaller than a corresponding initial validity period. In this case, the determined validity period can be set to the corresponding initial validity period to avoid the validity period of a transport layer protocol is too short.

In addition, the procedure for determining the transport layer protocol described above (e.g., the client transmits the plurality of service requests based on a plurality of transport layer protocols, or the server receives the plurality of service requests and the follow-up steps) can be based on one of a plurality of protocol determination modes. The plurality of protocol determination modes can comprise a first protocol determination mode (which can also be referred as to racing preferred mode) in which the procedure is performed (directly) when a client connects to a network or when the network of the client changes or a set validity period of the determined transport layer protocol expires, and a second protocol determination mode (which can also be referred as to racing avoided mode) in which the transmitting of the service requests (i.e., the receiving of the service requests (i.e., step S310) at the server) is performed in response to a failure of communication between the client and the server using a specified transport layer protocol (e.g., a transport layer protocol with a highest priority among the plurality of transport layer protocols). In this disclosure, the first protocol determination mode can be a default protocol determination mode used when a client connects to a network or when the network of the client changes or a set validity period of the determined transport layer protocol expires in an embodiment. In another embodiment, the second protocol determination mode can be a default protocol determination mode used when the client connects to the network or when the network of the client changes or the set validity period of the determined transport layer protocol expires. Further, it is possible to set the first or second protocol determination mode as the default protocol determination mode dynamically based on performing the determination of the transport layer protocol for the communication (for example, the frequency of performing the determination of the transport layer protocol for the communication), so that the suitable protocol determination mode can set as the default protocol determination mode, thereby facilitating the communication between the client and the server.

Exemplarily, in a case where the second protocol determination mode is a default protocol determination mode used when a client connects to a network or when the network of the client changes or a set validity period of the determined transport layer protocol expires, the first protocol determination mode can become the default protocol determination mode in a case where the determination of the transport layer protocol for communication (i.e., Step 310 and/or the next steps) is performed a predefined times within a first predefined time period. After the first protocol determination mode becomes the default protocol determination mode, the second protocol determination mode can re-become the default protocol determination mode, in a case where the determination of the transport layer protocol for communication is not performed for a second predefined time period.

In addition, as described above the plurality of transport layer protocols can have corresponding priorities, which are the same as or different from each other. In an embodiment, the priorities of the plurality of transport layer protocols can be fixed. In another embodiment, the priorities of the plurality of transport layer protocols can change dynamically based on the result of determining the transport layer protocol for communication. Exemplarily, after the same transport layer protocol is determined for communication predefined times consecutively, a priority of the same transport layer protocol is added by a predefined level. In this manner, the priority of the transport layer protocol can be suitable for the real communication environment between the client and the server.

In practice, the validity period, the protocol determination mode, and the priority for the transport layer protocol can form a strategy for determining the transport layer protocol (which can be called a protocol determining strategy for short). Exemplarily, table 1 below illustrates example parameters related to the protocol determining strategy.

TABLE 1

Example parameters related to the protocol determining strategy

| Parameter name | Meaning |
| --- | --- |
| $t_i$, i = 1, 2, ... N | The initial validity period of the i-th transport layer protocol of N transport layer protocols. |
| a | The coefficient for increasing the validity period. When the result of the determination of the transport layer protocol is consistent with that of the previous determination of the transport layer protocol, the validity period of the transport layer protocol corresponding to the result is multiplied by this coefficient. |
| b | The coefficient for decreasing the validity period. When the result of the determination of the transport layer protocol is inconsistent with that of the previous determination of the transport layer protocol, the validity period of the transport layer protocol corresponding to the result is multiplied by this coefficient. |
| m, n | If the determination of the transport layer protocol is triggered more than n times in m hours in the second protocol determination mode, the default protocol determination mode is switched to the first protocol determination mode. |
| h | If the determination of the transport layer protocol is not performed in h hours in the first protocol determination mode, the default protocol determination mode is switched to the second protocol determination mode. |
| $p_i$, i = 1, 2, ... N | The initial priority of the i-th transport layer protocol of N transport layer protocols |
| k, i | After the same transport layer protocol is determined for communication k times consecutively, a priority of the same transport layer protocol is added by a level of i. |

The validity period t set for the determined transport layer protocol can be determined based on $t_i$, a, and b listed in the above table 1. After t expires, the client will enter into the first protocol determination mode or the second protocol determination mode. The above parameters can be dynamically set, and different parameter combinations can be set according to different scenarios and different network environments, so as to realize multi-scenario adaptation of the determination of the transport layer protocol.

In the above, the method (e.g., method 300) for determining a transport layer protocol for communication is described in connection with FIGS. 1-4. The method for determining the transport layer protocol for communication according to embodiments of this disclosure can determine the best transport layer protocol for the communication between a client and a server based on the communication metrics (i.e., application layer metrics) that can be perceived and easily collected by the application layer, which can be directly realized in application program codes without the help of the professional network detection tools or the underlying logic for going deep into the transport layer protocol, so that the method has a wide application range and is convenient to realize. In the method according to the embodiment of the disclosure, the parameters related to the protocol determining strategy can be dynamically set, and different parameter combinations can be set according to different scenarios and different network environments, so as to realize multi-scenario adaptation of the determination of the transport layer protocol.

In the following, the disclosure will describe an electronic device (e.g., a service device) for determining a transport layer protocol for communication according to an embodiment of the present disclosure.

Figure 5:
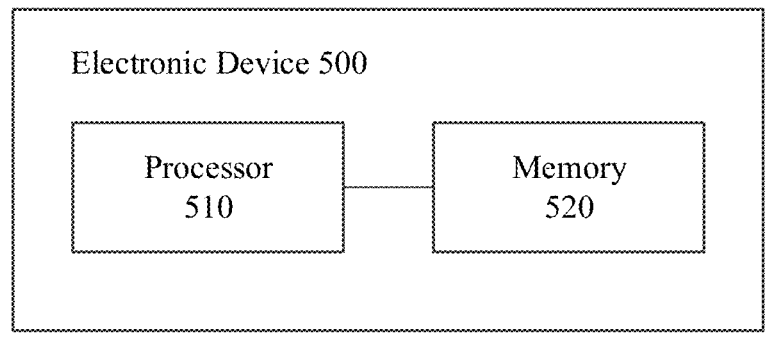
FIG. 5 illustrates an example electronic device according to an embodiment of the present disclosure.

FIG. 5 illustrates an example electronic device 500 according to an embodiment of the present disclosure. As shown in FIG. 5, the electronic device 500 can comprise processor(s) 510, and a memory 520. The memory 520 is coupled to at least one of the processors 510. A set of computer program instructions can be stored in the memory 520. The set of computer program instructions cause the electronic device 500 to perform the method for determining a transport layer protocol for communication according to the embodiment of the present disclosure when executed by at least one of the processors 510.

The electronic device 500 can function as a server device or a client device. When functioning as the server device, the set of computer program instructions stored in the memory 520 cause the electronic device 500 to receive, from a client, a plurality of service requests based on a plurality of transport layer protocols; determine a plurality of sets of metric values of application layer metrics by determining a set of metric values of the application layer metrics based on receiving each of the plurality of the service requests, wherein the application layer metrics are associated with at least one of efficiency or quality of receiving the service request; and determine the transport layer protocol for communication from the plurality of transport layer protocols based on the determined plurality of sets of metric values. In addition, the set of computer program instructions stored in the memory 520 can cause the electronic device 500 to perform other steps of the method performed by the server for determining the transport layer protocol for communication according to the embodiment of the present disclosure.

When functioning as the client device, the set of computer program instructions stored in the memory 520 cause the electronic device 500 to transmit, to a server, a plurality of service requests based on a plurality of transport layer protocols; receive an indication to indicate the transport layer protocol determined for the communication by the server, and use the transport layer protocol determined for the communication to perform the communication between the client and the server. In addition, the set of computer program instructions stored in the memory 520 can cause the electronic device 500 to perform other steps of the method performed by the client for determining the transport layer protocol for communication according to the embodiment of the present disclosure.

Figure 6:
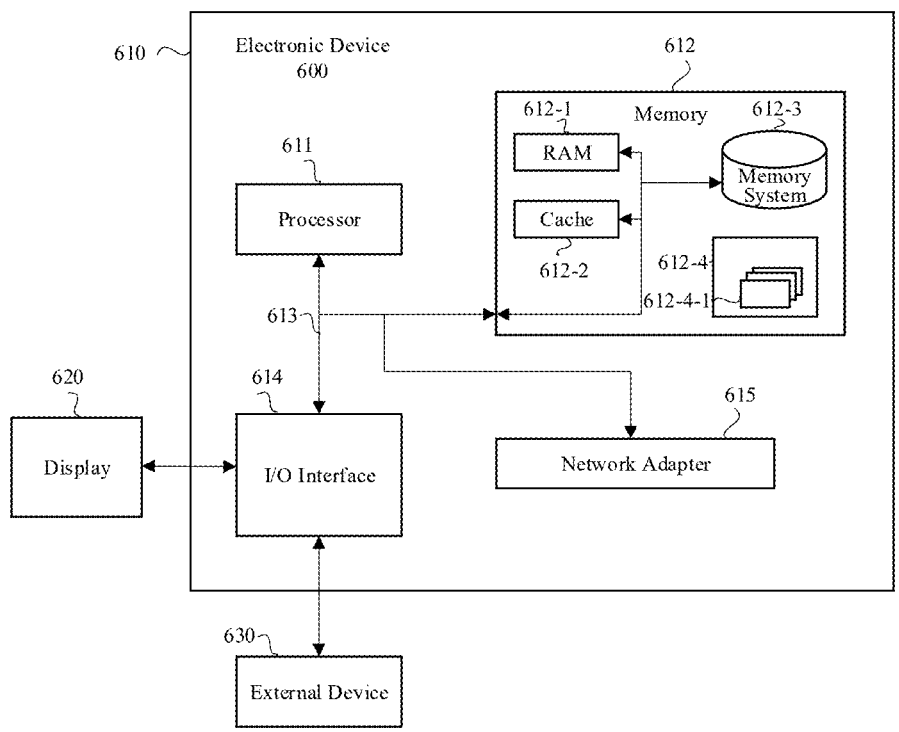
FIG. 6 illustrates another example electronic device according to an embodiment of the present disclosure.

FIG. 6 illustrates another example electronic device 600 according to an embodiment of the present disclosure. As shown in FIG. 6, the electronic device 600 for determining a transport layer protocol for communication according to an embodiment of the present disclosure can be expressed in the form of a general-purpose computing device, which may include, but is not limited to, one or more processors or processing units 611, a memory 612, and a bus 613 connecting different system components (including the processor 611 and the memory 612).

The bus 613 represents one or more of several types of bus structures, including a memory bus or a memory controller, a peripheral bus, a graphics acceleration port, a processor, or a local bus using any of a variety of bus structures. For example, these architectures include, but are not limited to, industry-standard architecture (ISA) bus, micro-channel architecture (MAC) bus, Enhanced ISA bus, video electronics standards association (VESA) local bus and peripheral component interconnection (PCI) bus.

The electronic device 600 for determining the transport layer protocol for communication according to the embodiment of the present disclosure may typically include a variety of computer system readable media. These media can be any available media that can be accessed by the electronic device 600 for determining the transport layer protocol for communication according to the embodiment of the present disclosure, including volatile and non-volatile media, removable and non-removable media.

The memory 612 may include a computer system readable medium in the form of volatile memory, such as random access memory (RAM) 612_1 and/or cache memory 612_2. The electronic device 600 for determining the transport layer protocol for communication according to the embodiment of the present disclosure may further include other removable/non-removable, volatile/non-volatile computer system storage media. By way of example only, the storage system 612_3 may be used to read from or write to an immovable, non-volatile magnetic medium (not shown in FIG. 6, commonly referred to as a "hard disk drive"). Although not shown in FIG. 6, a disk drive for reading from and writing to a removable non-volatile magnetic disk (e.g., "floppy disk") and an optical disk drive for reading from and writing to a removable non-volatile optical disk (e.g., CD-ROM, DVD-ROM or other optical media) may be provided. In these cases, each drive may be connected to the bus 613 through one or more data medium interfaces. The memory 612 may include at least one program product having a set of (e.g., at least one) program modules configured to perform the functions of various embodiments of the present invention.

A program/utility 612_4 with a group (at least one) of program modules 612_4_1 may be stored in the memory 612, for example. Such program modules 612_4_1 include but are not limited to an operating system, one or more application programs, other program modules and program data, and each or some combination of these examples may include the implementation of a network environment. The program module 612_4_1 generally performs the functions and/or methods in the embodiments described in the present disclosure.

The electronic device 600 for determining the transport layer protocol for communication according to the embodiment of the present disclosure can also communicate with one or more external devices 630 (such as a keyboard, a pointing device, a display 620, etc.), and can also communicate with one or more devices that enable users to interact with the electronic device 600 for determining the transport layer protocol for communication according to the embodiment of the present disclosure, and/or communicate with any device (e.g., a network card, a modem, etc.) that enables the electronic device 600 for determining the transport layer protocol for communication according to an embodiment of the present disclosure to communicate with one or more other computing devices. This communication may be through an input/output (I/O) interface 614. Moreover, the electronic device 600 for determining the transport layer protocol for communication according to the embodiment of the present disclosure can also communicate with one or more networks (e.g., a local area network (LAN), a wide area network (WAN) and/or public networks, such as the Internet) through the network adapter 615. As shown in the FIG. 6, the network adapter 615 communicates with other modules of the electronic device 600 for determining the transport layer protocol for communication according to the embodiment of the present disclosure through the bus 613. It should be understood that although not shown in the FIG. 6, other hardware and/or software modules including but not limited to a microcode, device drivers, redundant processing units, external disk drive arrays, RAID systems, tape drives, data backup storage systems, etc. can be used in conjunction with the electronic device 600.

Further, it also should be understood that the electronic device 600 for determining the transport layer protocol for communication shown in FIG. 6 is only an example, and should not bring any limitation to the function and application scope of the embodiment of the present disclosure.

In addition, the present disclosure further provides a non-transitory computer readable storage medium having instructions stored thereon, when executed by a processor, causing the processor to: receive, from a client, a plurality of service requests based on a plurality of transport layer protocols; determine a plurality of sets of metric values of application layer metrics by determining a set of metric values of the application layer metrics based on receiving each of the plurality of the service requests, wherein the application layer metrics are associated with at least one of efficiency or quality of receiving the service request; and determine the transport layer protocol for communication from the plurality of transport layer protocols based on the determined plurality of sets of metric values.

In addition, the present disclosure further provides an electronic apparatus comprising means for steps of the method for determining the transport layer protocol (e.g., method 300) according to any embodiments of the present disclosure.

In addition, the present disclosure further provides a computer program product storing instructions which, when being executed by a processor, implements the method for determining the transport layer protocol (e.g., method 300) according to any embodiments of the present disclosure.

So far, the present disclosure has disclosed the method, electronic device, electronic apparatus, non-transitory computer readable storage medium, and computer program product for determining a transport layer protocol for communication according to embodiments of the disclosure. The disclosed method can determine the best transport layer protocol for the communication between a client and a server based on the communication metrics (i.e., application layer metrics) that can be perceived and easily collected by the application layer, which can be directly realized in application program codes without the help of the professional network detection tools or the underlying logic for going deep into the transport layer protocol, so that the method has a wide application range and is convenient to realize. In the method according to the embodiment of the disclosure, the parameters related to the protocol determining strategy can be dynamically set, and different parameter combinations can be set according to different scenarios and different network environments, so as to realize multi-scenario adaptation of the determination of the transport layer protocol.

It should be noted that the above description is only some embodiments of the present disclosure and an illustration of the applied technical principles. It should be understood by those skilled in the art that the present disclosure scope involved in the present disclosure is not limited to the technical solutions resulted from specific combinations of the above technical features, but also encompasses other technical solutions resulted from any combination of the above technical features or their equivalents without departing from the above disclosed concept, for example, the technical solutions formed by replacing between the above features and the technical features with similar functions disclosed in the present disclosure (but not limited thereto).

In addition, although the operations are depicted in a specific order, this should not be understood as requiring these operations to be performed in the specific order shown or in a sequential order. In certain circumstances, multitasking and parallel processing may be beneficial. Likewise, although several specific implementation details are included in the above discussion, these should not be interpreted as limiting the scope of the present disclosure. Some features described in the context of separate embodiments can also be implemented in a single embodiment in combination. On the contrary, various features described in the context of a single embodiment can also be implemented in multiple embodiments alone or in any suitable sub-combination.

Although the subject matter has been described in a language specific to structural features and/or logical acts of methods, it should be understood that the subject matter defined in the appended claims is not necessarily limited to the specific features or acts described above. On the contrary, the specific features and actions described above are merely example forms of implementing the claims.

What is claimed is:

1. A method for determining a transport layer protocol for communication, comprising:
   receiving, from a client, a plurality of service requests based on a plurality of transport layer protocols;
   determining a plurality of sets of metric values of application layer metrics by determining a set of metric values of the application layer metrics based on receiving each of the plurality of the service requests, wherein the application layer metrics are associated with at least one of efficiency or quality of receiving the service request;
   determining the transport layer protocol for communication from the plurality of transport layer protocols based on the determined plurality of sets of metric values; and
   setting a validity period for the determined transport layer protocol for communication.

2. The method of claim 1, wherein the application layer metrics comprise at least one of time consumption for receiving the service request, a transmission rate of the service request, or transmission integrity of the service request.

3. The method of claim 1, wherein the plurality of transport layer protocols comprise a first transport layer protocol and a second transport layer protocol, and the determined plurality of sets of metric values comprise a first set of metric values corresponding to the first transport layer protocol and a second set of metric values corresponding to the second transport layer protocol, and wherein determining the transport layer protocol for communication comprises:
   determining a set of change ratios of metric values within the second set of metric values relative to corresponding metric values within the first set of metric values;
   computing a weighted sum of the set of change ratios, and determining the transport layer protocol for communication from the first transport layer protocol and the second transport layer protocol based on the weighted sum.

4. The method of claim 3, wherein determining the transport layer protocol for communication from the first transport layer protocol and the second transport layer protocol comprises:
   comparing the weighted sum with a threshold; and
   determining the transport layer protocol for communication from the first transport layer protocol and the second transport layer protocol based on the comparison.

5. The method of claim 4, wherein the threshold is zero, wherein the first transport layer protocol is a quick user datagram protocol (UDP) internet connection (QUIC) protocol, and wherein the second transport layer protocol is a transmission control protocol (TCP).

6. The method of claim 3, wherein a set of weights for computing the weighted sum is based on a communication scenario.

7. The method of claim 6, wherein
   for a first communication scenario which gives priority to integrity of data transmission, a sum of a first subset of the set of weights is larger than a sum of a second subset of the set of weights, and
   for a second communication scenario which gives priority to a real-time performance of data transmission, the sum of the first subset of the set of weights is smaller than the sum of the second subset of the set of weights,
   wherein application layer metrics corresponding to the first subset of the set of weights are associated with the quality of receiving the service request, and
   wherein application layer metrics corresponding to the second subset of the set of weights are associated with the efficiency of receiving the service request.

8. The method of claim 1, wherein in a case where one or more of the plurality of the service requests are not received successfully, one or more transport layer protocols corresponding to the one or more service requests are excluded from the plurality of transport layer protocols when determining the transport layer protocol for communication.

9. The method of claim 8, wherein in a case where the plurality of the service requests are not received successfully, a transport layer protocol with a highest priority among the plurality of transport layer protocols is determined as the transport layer protocol for communication.

10. The method of claim 1, wherein for each of the plurality of transport layer protocols, its next corresponding validity period is determined by multiplying its current corresponding validity period and a current validity factor.

11. The method of claim 10, wherein for each of the plurality of transport layer protocols, its current validity factor is a validity factor larger than 1 when the transport layer protocol is determined as the transport layer protocol for communication, and its current validity factor is a validity factor smaller than 1 when the transport layer protocol is not determined as the transport layer protocol for communication.

12. The method of claim 11, wherein initial validity periods corresponding to the plurality of transport layer protocols are different from each other, and wherein in a case where the determined validity period is smaller than a corresponding initial validity period, the determined validity period is set to the corresponding initial validity period.

13. The method of claim 1, wherein the receiving is performed based on one of a plurality of protocol determination modes, and
wherein the plurality of protocol determination modes comprise a first protocol determination mode in which the receiving is performed when a client connects to a network or when a network of the client changes or a set validity period of the determined transport layer protocol expires, and a second protocol determination mode in which the receiving is performed in response to a failure of communication between the client and a server using a transport layer protocol with a highest priority among the plurality of transport layer protocols.

14. The method of claim 13,
wherein the second protocol determination mode is a default protocol determination mode used when the client connects to the network or when the network of the client changes or the set validity period of the determined transport layer protocol expires,
wherein the first protocol determination mode becomes the default protocol determination mode in a case where the receiving is performed a predefined times within a first predefined time period, and
wherein the second protocol determination mode re-becomes the default protocol determination mode, in a case where the receiving is not performed for a second predefined time period after the first protocol determination mode becomes the default protocol determination mode.

15. The method of claim 1, wherein after a same transport layer protocol is determined for communication predefined times consecutively, a priority of the same transport layer protocol is added by a predefined level.

16. An electronic device for determining a transport layer protocol for communication, comprising:
one or more processors;
a memory coupled to at least one of the processors; and
a set of computer program instructions stored in the memory, which, when executed by at least one of the processors cause the electronic apparatus to:
receive, from a client, a plurality of service requests based on a plurality of transport layer protocols;
determine a plurality of sets of metric values of application layer metrics by determining a set of metric values of the application layer metrics based on receiving each of the plurality of the service requests, wherein the application layer metrics are associated with at least one of efficiency or quality of receiving the service request;
determine the transport layer protocol for communication from the plurality of transport layer protocols based on the determined plurality of sets of metric values; and
set a validity period for the determined transport layer protocol for communication.

17. The electronic apparatus of claim 16, wherein the application layer metrics comprise at least one of time consumption for receiving the service request, a transmission rate of the service request, or transmission integrity of the service request.

18. The electronic apparatus of claim 16, wherein the plurality of transport layer protocols comprise a first transport layer protocol and a second transport layer protocol, and the determined plurality of sets of metric values comprise a first set of metric values corresponding to the first transport layer protocol and a second set of metric values corresponding to the second transport layer protocol, and wherein determining the transport layer protocol for communication comprises:
determining a set of change ratios of metric values within the second set of metric values relative to corresponding metric values within the first set of metric values;
computing a weighted sum of the set of change ratios, and
determining the transport layer protocol for communication from the first transport layer protocol and the second transport layer protocol based on the weighted sum.

19. A non-transitory computer readable storage medium having instructions stored thereon, when executed by a processor, causing the processor to:
receive, from a client, a plurality of service requests based on a plurality of transport layer protocols;
determine a plurality of sets of metric values of application layer metrics by determining a set of metric values of the application layer metrics based on receiving each of the plurality of the service requests, wherein the application layer metrics are associated with at least one of efficiency or quality of receiving the service request;
determine the transport layer protocol for communication from the plurality of transport layer protocols based on the determined plurality of sets of metric values; and
set a validity period for the determined transport layer protocol for communication.

* * * * *